April 2, 1963

L. A. WILKINS 3,083,387

APPARATUS FOR CONDITIONING FILM

Filed Sept. 6, 1960

Inventor
Lowell A. Wilkins by Hill, Sherman, Meroni, Gross & Simpson Attys.

United States Patent Office 3,083,387
Patented Apr. 2, 1963

3,083,387

APPARATUS FOR CONDITIONING FILM

Lowell A. Wilkins, 6 N. 256 Linden Ave., Roselle, Ill.

Filed Sept. 6, 1960, Ser. No. 54,039
1 Claim. (Cl. 15—93)

The present invention relates to an apparatus for conditioning motion picture film and the like for the reception of an adherent magnetic sound track.

In recent years, magnetic sound tracks on motion picture film have begun to replace the optical sound tracks which had heretofore been used. The magnetic tracks have the advantages of lower cost and the ability to be erased and edited, making them particularly useful for the home movie field.

Conventional motion picture films provide only a very limited area for the incoporation of a magnetic sound track. This area exists between the marginal edge of the film and the edge of the sprocket holes. One of the main problems in applying a magnetic sound track to motion picture film consists in securing uniformity of the magnetic material in this very limited area in order to achieve proper recording characteristics.

The magnetic sound track can be applied as a paint or coating containing finely divided, magnetic iron oxide (either a gamma ferric oxide or ferrosoferric oxide) in combination with a binder which may be a phenolic resin, or a thermo-plastic resin such as a vinyl resin. The binder must be such that it resists the action of the developing chemicals employed in the processing of the exposed motion picture film.

It is particularly difficult to secure a magnetic sound track to color films and the like which contain an anti-halation backing containing finely divided carbon particles. The presence of this backing susbtantially interferes with the ability of the resinous binder in the magnetic sound track to adhere to the film base. One of the principle objects of the present invention is to provide an apparatus for continuously removing a predetermined portion of such anti-halation layer to render the film receptive to a subsequently applied magnetic sound track.

Another object of the present invention is to provide an improved apparatus for stripping a band of predetermined width from a film without the use of any chemical treatment.

Another object of the invention is to provide an apparatus for conditioning a motion picture film for the reception of a magnetic sound track in a continuous operation.

Still another object of the invention is to provide a simplified, continuous machine for uniformly cutting a band of predetermined width from the anti-halation layer of an unexposed motion picture film.

A further description of the present invention will be made in conjunction with the attached sheet of drawings in which.

Figure 2:
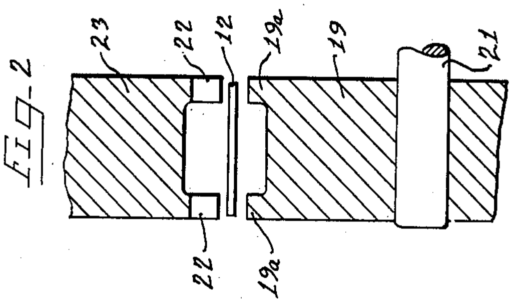
FIGURE 2 is a fragmentary cross-sectional view of the cutter portion of the assembly.

In the drawings, reference numeral 10 indicates generally a light-tight housing in which the film stripping mechanism is housed. The housing 10 is provided with a removable cover 11 to permit access to the interior.

Figure 1:
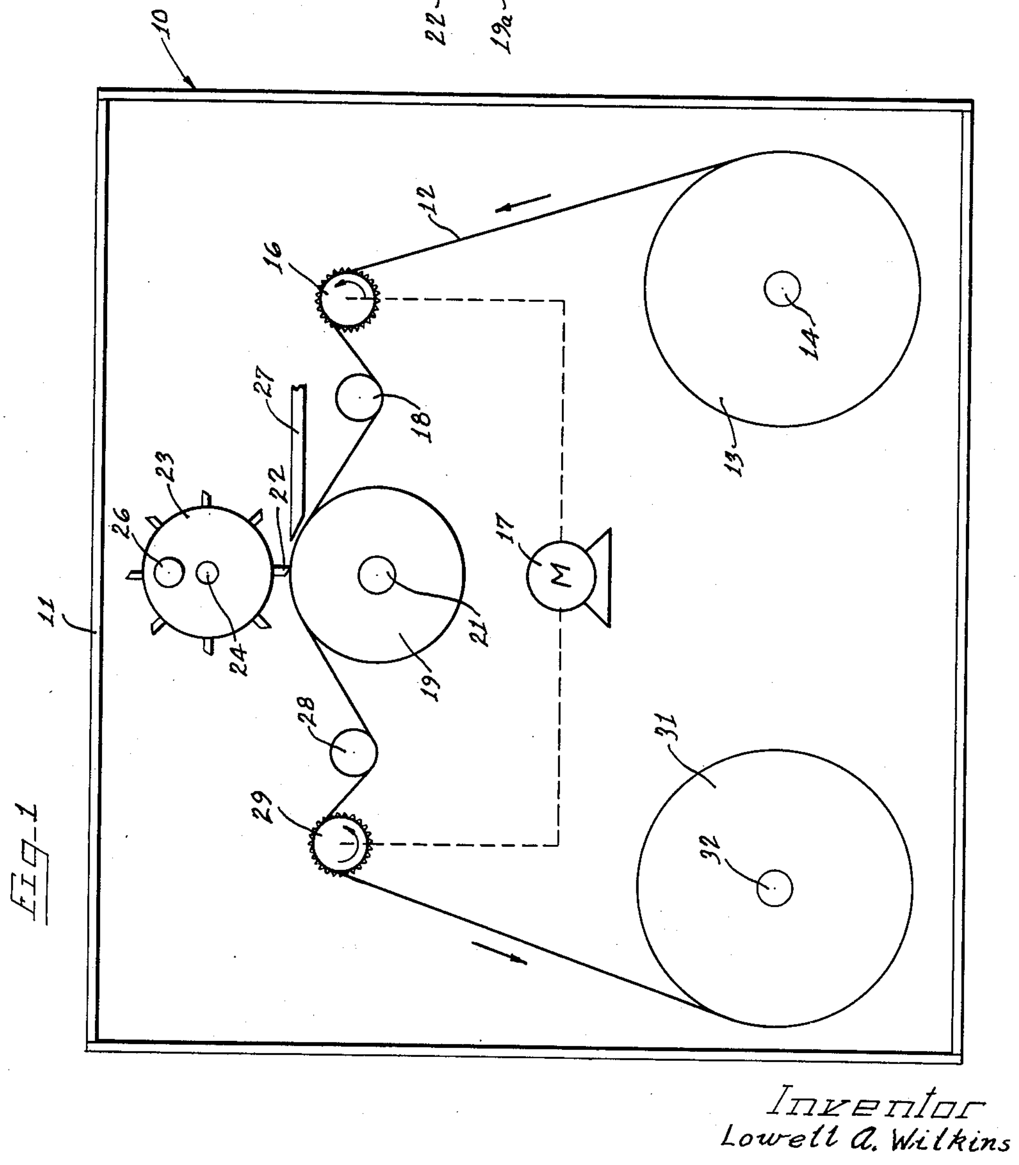
FIGURE 1 is a somewhat schematic view of an apparatus employed in the practice of the present invention.

A supply of unexposed motion picture film 12 is received from a supply reel 13 mounted for rotation on a spindle 14. The film 12 travels from right to left as viewed in FIGURE 1, and is pulled from the supply reel 13 by a sprocket 16 driven by means of a motor 17. In order to apply an adequate tension to the film 12 as it is being unreeled, the supply reel 13 may be provided with suitable braking means of the type well known in the art.

The film 12 then passes under a tensioning roller 18 and then over the periphery of a rigid idler roller 19 mounted for rotation on a shaft 21.

While the film 12 is supported on the movable idler roller 19, it is stripped along a predetermined width by the action of one or more cutter teeth 22 mounted on a milling cutter 23. The cutter is mounted for periodical rotation on a shaft 24 and an indexing pin generally indicated at numeral 26 in the drawings is provided to periodically change the cutter tooth which is in engagement with the film 12, as the cutter tooth becomes worn.

The structure of the cutting mechanism is best illustrated in FIGURE 2 of the drawings. As shown, the film 12 is arranged to have two slits cut along side the marginal edges thereof by the action of the opposed cutter teeth 22. This type of system will be used, for example, in removing two tracks simultaneously from a sixteen millimeter film before the sixteen millimeter film is slit into two eight millimeter films in accordance with normal practice.

As shown in FIGURE 2, the idler roller 19 has two raised peripheral surfaces 19*a* which support the edges of the film 12 while the stationary cutter teeth 22 engage the film 12 and strip from it the two parallel bands upon which the magnetic sound track is to be incorporated. In order to eliminate the cuttings which result, I provide a nozzle 27 attached to a vacuum cleaner or the like so that the cuttings are removed substantially as fast as they are formed.

After the two bands are cut from the film 12, the film passes under a second tensioning roller 28, over a second motor driven sprocket 29, and then the film is wound up on a take-up reel 31 mounted for rotation on a spindle 32. The reel 31 may also be driven by the motor 17, preferably by means of a slipping clutch arrangement so that the tension on the film 12 remains substantially uniform regardless of the amount of film being wound up on the reel 31.

With the assembly of the present invention, the motion picture film is stripped continuously of materials which would interfere with the adhesion of a magnetic sound track on the film. The apparatus is also easy to maintain, easy to install, and is inexpensive.

It will be evident that various modifications can be made to the described embodiments without departing from the scope of the present invention as set forth in the claim.

I claim as my invention:

An apparatus for stripping a band of predetermined width from a film which comprises, a supply reel for supplying film at a substantially uniform rate, a rigid idler roller arranged to receive the film thereover, a stationary cutter head in spaced relation to said idler roller, said cutter head including a plurality of peripherally spaced cutter teeth, and indexing means for selectively engaging one of said teeth with the film on said idler roller to strip said band therefrom.

References Cited in the file of this patent

UNITED STATES PATENTS

| | | |
|---|---|---|
| 960,437 | Thompson | June 7, 1910 |
| 2,238,996 | Fisher | Apr. 22, 1941 |
| 2,257,182 | McClay | Sept. 30, 1941 |
| 2,680,938 | Peterson | June 15, 1954 |
| 2,869,878 | Camras | Jan. 20, 1959 |
| 2,982,003 | Weberling | May 2, 1961 |

FOREIGN PATENTS

| | | |
|---|---|---|
| 164,708 | Great Britain | Nov. 17, 1920 |
| 606,659 | Canada | Oct. 11, 1960 |
| 728,783 | Great Britain | Apr. 27, 1955 |
| 736,253 | Great Britain | Sept. 7, 1955 |
| 799,048 | Great Britain | June 11, 1956 |
| 853,524 | Germany | Oct. 27, 1952 |